(12) United States Patent
Muharemovic et al.

(10) Patent No.: US 7,990,916 B2
(45) Date of Patent: Aug. 2, 2011

(54) CELL SPECIFIC SOUNDING REFERENCE SIGNAL SUB-FRAME CONFIGURATION

(75) Inventors: Tarik Muharemovic, Dallas, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 136 days.

(21) Appl. No.: 12/432,031

(22) Filed: Apr. 29, 2009

(65) Prior Publication Data

US 2009/0279459 A1 Nov. 12, 2009

Related U.S. Application Data

(60) Provisional application No. 61/051,482, filed on May 8, 2008, provisional application No. 61/051,453, filed on May 8, 2008, provisional application No. 61/048,738, filed on Apr. 29, 2008.

(51) Int. Cl.
*H04J 3/00* (2006.01)

(52) U.S. Cl. ...................................... 370/328

(58) Field of Classification Search .................. 370/280, 370/329, 342, 348, 335, 336, 328
See application file for complete search history.

(56) References Cited

U.S. PATENT DOCUMENTS

2004/0160936 A1* 8/2004 Liu et al. .................. 370/348
2007/0270154 A1* 11/2007 Kim et al. ................. 455/450

* cited by examiner

*Primary Examiner* — Derrick W Ferris
*Assistant Examiner* — Mohammad Anwar
(74) *Attorney, Agent, or Firm* — Robert D. Marshall, Jr.; W. James Brady; Frederick J. Telecky, Jr.

(57) ABSTRACT

A method of wireless communication including a plurality of fixed base stations and a plurality of mobile user equipment with each base station transmitting to any user equipment within a corresponding cell a sounding reference signal sub-frame configuration indicating sub-frames when sounding is permitted. Each user equipment recognizes the sounding reference signal sub-frame configuration and sounds only at permitted sub-frames. Differing cells may have differing sounding reference signal sub-frame configurations. There are numerous manners to encode the transmitted information.

6 Claims, 3 Drawing Sheets

CELL SPECIFIC SOUNDING REFERENCE SIGNAL SUB-FRAME CONFIGURATION

CLAIM OF PRIORITY

This application claims priority under 35 U.S.C. 119(e)(1) to U.S. Provisional Application No. 61/048,738 filed Apr. 29, 2008, U.S. Provisional Application No. 61/051,453 filed May 8, 2008 and U.S. Provisional Application No. 61/051,482 filed May 8, 2008.

TECHNICAL FIELD OF THE INVENTION

The technical field of this invention is wireless communication.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

FIG. 2 shows the Evolved Universal Terrestrial Radio Access (E-UTRA) time division duplex (TDD) Frame Structure. Different sub-frames are allocated for downlink (DL) or uplink (UL) transmissions. Table 1 shows applicable DL/UL sub-frame allocations.

TABLE 1

| Con-figuration | Switch-point periodicity | \multicolumn{10}{c}{Sub-frame number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Sounding RS enables time and frequency domain scheduling and has been adopted as a RAN1 working assumption for EUTRA. The channel quality indicator (CQI) estimate obtained from sounding can be expired or stale because of the inevitable time delay between channel sounding and the follow-up scheduled transmission. This is more pronounced for faster user equipment (UE). Thus faster UE needs to have more frequent sounding in order to maintain the fresh CQI at the NodeB. For example a UE with a Doppler of 200 Hz requires a propagation channel for every fifth sub-frame because the sub-frame rate is 1000 Hz. In such case for channel adaptive modulation and coding (AMC) to be performed, the UE must sound nearly every sub-frame or every other sub-frame. The objective of maintaining a fresh CQI at the NodeB may be impossible for very fast UEs having a Doppler of 200 Hz or more because the channel can change substantially between sub-frames. For such fast UEs, a slow rate of infrequent sounding can be performed. Slower UEs naturally ought to sound less frequently. As the UE speed increases, the sounding period should reduce up to a point. Very fast UEs should abandon the goal of maintaining a fresh CQI and sound less frequently.

A simple solution is to configure each cell with a common sounding period for each UE and for each sounding resource. However, any cell may contain UEs with a spread of velocities yielding a spread of Dopplers. Allocating sounding resources to UEs corresponding to the set of UEs velocities would be efficient. This allocation enables efficient utilization of sounding resources. In another proposed allocation, very slow UEs sound only once per several sub-frames and intermediate speed UEs sound once per few sub-frames. This allocation is not straight forward and not always possible. It is mathematically impossible to share a common sounding resource between one UE sounding every 2 sub-frames and a second UE sounding every 3 sub-frames. There is a need in the art to use different sounding periods different cells while tailoring each sounding period to the velocity of a UE or subset of UEs.

SUMMARY OF THE INVENTION

A method of wireless communication including a plurality of fixed base stations and a plurality of mobile user equipment with each base station transmitting to any user equipment within a corresponding cell a sounding reference signal sub-frame configuration indicating sub-frames when sounding is permitted. Each user equipment recognizes the sounding reference signal sub-frame configuration and sounds only at permitted sub-frames. Differing cells may have differing sounding reference signal sub-frame configurations. There are numerous manners to encode the transmitted information.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
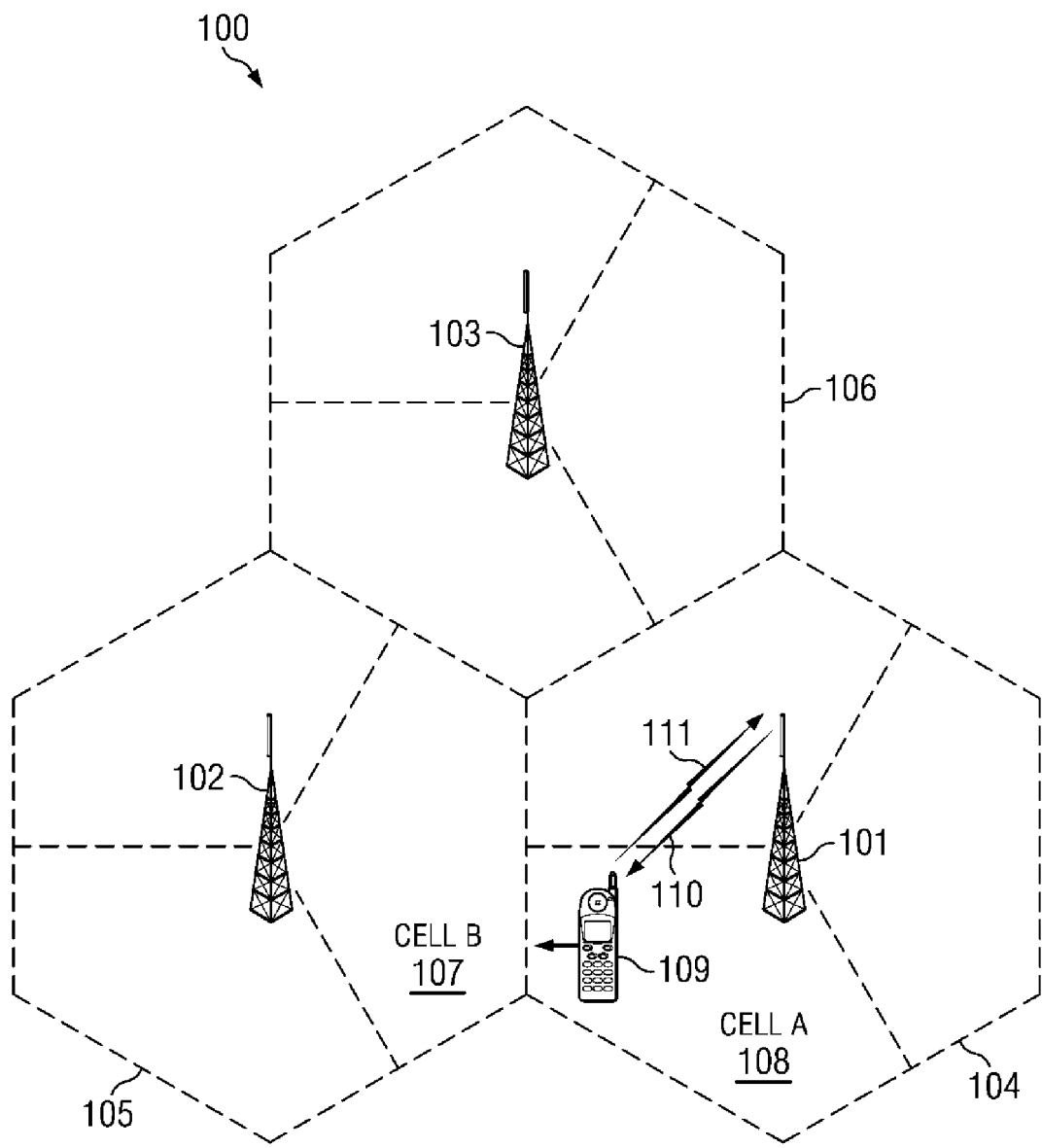
FIG. 1 is a diagram of a communication system of the prior art related to this invention having three cells.
Figure 2:
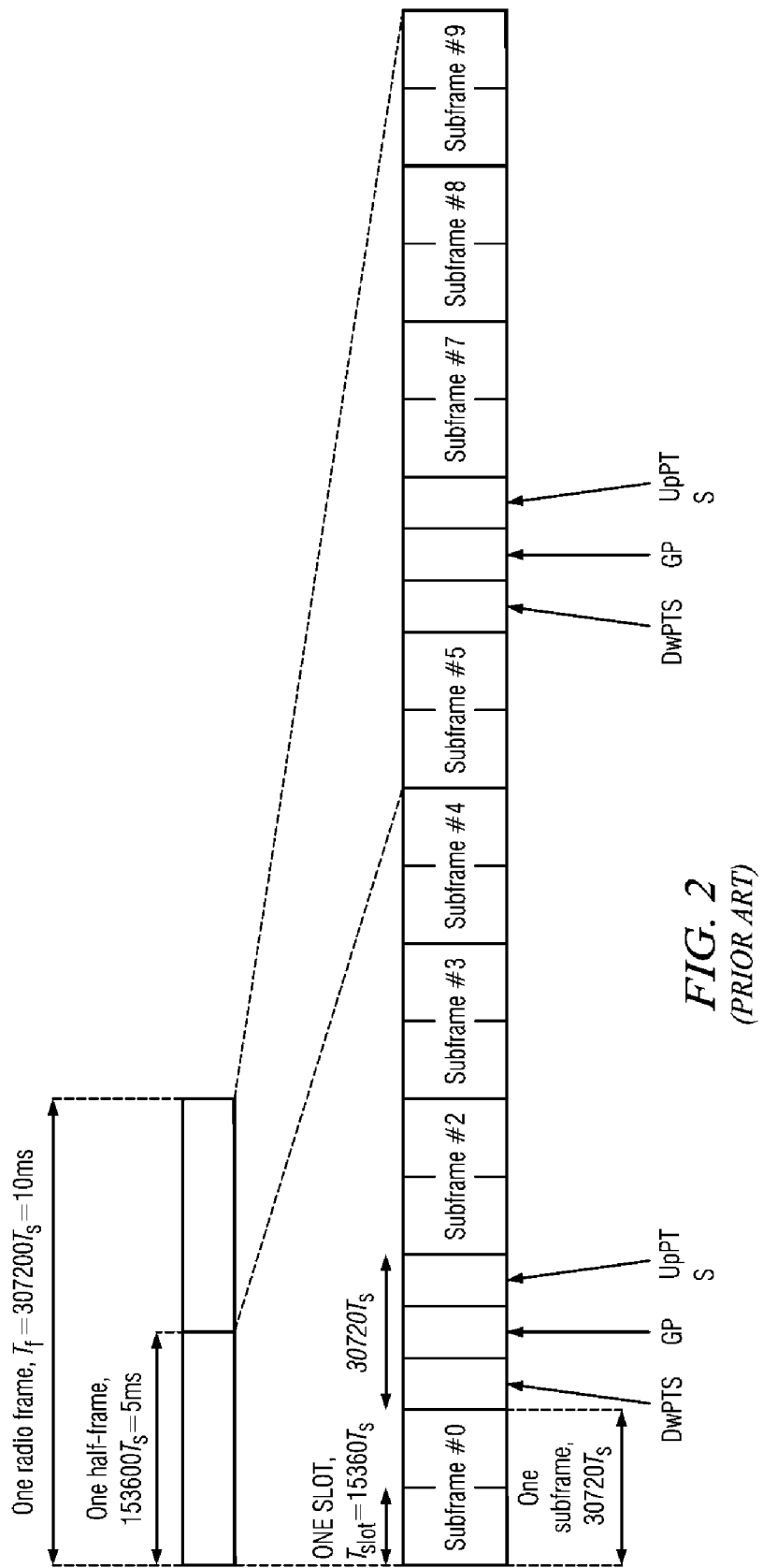
FIG. 2 shows the Evolved Universal Terrestrial Radio Access (E-UTRA) TDD Frame Structure of the prior art.

Sounding involves exchange of signals between the base station and the connected user equipment. Each sounding uses a reference resource identifier selected from an available reference resource identifier map h(t, L) and a portion of the spectrum selected from an available spectrum identifier map f(t, N); where L is a group of shared parameters signaled to each UE from the group; and N is a group of shared parameters signaled to each UE from the group. Some examples utilize Constant Amplitude Zero Auto-correlation (CAZAC) sequences as the reference sequences. CAZAC sequences are complex-valued sequences with: constant amplitude (CA); and zero cyclic autocorrelation (ZAC). Examples of CAZAC sequences include: Chu sequences, Frank-Zadoff sequences, Zadoff-Chu (ZC) sequences and generalized chirp-like (GCL) sequences. CAZAC (ZC or otherwise) sequences are presently preferred.

Zadoff-Chu (ZC) sequences, as defined by:

$$a_m(k) = e^{\left[j2\pi(m/N)\left[\frac{k(k+1)}{2}+qk\right]\right]} \text{ for } N \text{ odd,}$$

$$a_m(k) = e^{\left[j2\pi(m/N)\left[\frac{k^2}{2}+qk\right]\right]} \text{ for } N \text{ even.}$$

An alternative convention of the ZC definition replaces j (the complex number $\sqrt{-1}$) in these formulas with −j. In the formula: m is the index of the root ZC sequence; N is the length of the sequence, with m and N are relatively prime; q is any fixed integer, for example, q=0 is a good choice because it simplifies computation as qk=0); and k is the index of the sequence element from {0, 1, ... N−1}. Making N a prime number maximizes the set of root ZC sequences having optimal cross-correlation. When N is prime, there are N−1 possible choices for m and each choice results in a distinct root ZC CAZAC sequence. The terms Zadoff-Chu, ZC, and ZC CAZAC are commonly used interchangeably.

The problem of allocating sounding resources is to cover each UE with sounding fast enough to meet their requirements. The maximum sounding period is generally related the UE Doppler, a measure of how fast the UE is moving relative to the base station. We assume that the sounding requirements of the set of UEs are fixed at any point in time but may vary slowly with time. This slow time change enables computing and using repeating patterns for the sounding resource allocation.

The sounding reference signal (SRS) sub-frame configuration is broadcast by base station 101 in system information blocks (SIB). This sub-frame configuration indicates which sub-frames are SRS sub-frames. Broadcast of the SRS sub-frame configuration is useful even for UEs 109 which do not transmit any SRS. SRS shouldn't collide with physical uplink shared channel (PUSCH) transmission. Thus non-SRS UEs 109 can extract some of their silent symbol periods from the SRS sub-frame configuration. These silent periods are useful for performing some measurements at UE 109. In general each cell 107 and 108 would employ a different SRS sub-frame configuration. Ideally, base stations 101, 102 and 103 would select SRS sub-frame configurations to minimize cross-cell interference.

There are two main ways of signaling and interpreting the SRS sub-frame configuration parameters. Sub-frame configuration can be defined by two parameters: the sub-frame period $T_{SFC}$; and the offset $\Delta_{SFC}$. Both UEs 109 and base station 101 keep a sub-frame counter $C_{SFC}$ permitting UE 109 and base station 101 to determine which sub-frames are configured for SRS transmission. A sub-frame is an SRS sub-frame if and only if $\Delta_{SFC} = (C_{SFC}) \mod T_{SFC}$. The exact range of values of ΔSFC and $T_{SFC}$ need to be defined with the number of bits and encoding for each. For example, $T_{SFC}$ could be selected from the set {1, 2, 3, 4, 5, ..., 32} allowing flexible system deployment $\Delta_{SFC}$ could be selected from the same set. This yields maximum flexibility, but requires 10 bits of broadcast SIB signaling, which can be very costly. A reduced overhead alternative encodes and signals $T_{SFC}$ first. This requires greatest integer in $\log_2(T_{SFC})$ (ceil[ $\log_2(T_{SFC})$]) bits. The bits required for $\Delta_{SFC}$ would be either the ceil[ $\log_2(T_{SFC})$] or the least integer in $\log_2(T_{SFC})$ (floor [ $\log_2(T_{SFC})$]) because $0 \leq \Delta_{SFC} < T_{SFC}$. This reduces the number of required bits for signaling $\Delta_{SFC}$, but only for certain scenarios where $T_{SFC}$ is small. Another reduced overhead alternative hard codes a value for $\Delta_{SFC}$ such as zero. In that case, only $T_{SFC}$ is signaled.

Configuration of the sounding reference signal (SRS) contains cell specific components and UE specific components. Cell specific components of the SRS configuration indicate particular subframes when the SRS transmission occurs. Cell specific components of the SRS configuration may include $T_{SFC}$ the SRS sub-frame period and $\Delta_{SFC}$ SRS sub-frame offset. The UE keeps a sub-frame counter $C_{SFC}$.

SRS sub-frames are those for which the counter $C_{SFC}$ satisfies the condition $\Delta_{SFC} = (C_{SFC}) \mod T_{SFC}$. These quantities $T_{SFC}$ and $\Delta_{SFC}$ must be signaled to the UEs. This is generally preformed by through SIB signaling. This invention includes a specific bit-map table for this signaling. This invention supports a very wide range of $T_{SFC}$ and the $\Delta_{SFC}$ values with 5-bit signaling. This invention supports values for $T_{SFC}$ in the set of {1, 2, 5, 10, 20, 40, Inf} ms. This invention also includes a proposed bit-map tables allowing a wide range of $\Delta_{SFC}$.

Table 2 shows the 5 bits signaled via SIB designating $T_{SFC}$ and $\Delta_{SFC}$ in time division duplex (TDD) applications according to one embodiment of this invention. For $\Delta_{SFC}$ of values 1 or 6 (i.e. Uplink Pilot Transmit Slot (UpPTS)), either one or both Single Carrier-Orthogonal Frequency Domain Multiplexing (SC-OFDM) symbols in UpPTS are used for SRS. The number of SC-OFDM symbols in UpPTS is broadcasted by another field in SIB. In other words, if UpPTS consists of 2 SC-OFDM symbols and is configured for SRS transmission, then both SC-OFDM symbols are used for SRS transmission. In TDD, sounding employs UpPTS resources except occupied by short Random Access Channel (RACH) are default for SRS. SRS is transmitted only in configured UL subframes or UpPTS.

TABLE 2

| Decimal | Binary | $T_{SFC}$ | $\Delta_{SFC}$ |
|---|---|---|---|
| 0 | 00000 | 1 | 0 |
| 1 | 00001 | 5 | 1 |
| 2 | 00010 | 5 | 2 |
| 3 | 00011 | 5 | 3 |
| 4 | 00100 | 5 | 4 |
| 5 | 00101 | 10 | 1 |
| 6 | 00110 | 10 | 2 |
| 7 | 00111 | 10 | 3 |
| 8 | 01000 | 10 | 4 |

TABLE 2-continued

| Decimal | Binary | $T_{SFC}$ | $\Delta_{SFC}$ |
|---|---|---|---|
| 9 | 01001 | 10 | 6 |
| 10 | 01010 | 10 | 7 |
| 11 | 01011 | 10 | 8 |
| 12 | 01100 | 10 | 9 |
| 13 | 01101 | 20 | 1 |
| 14 | 01110 | 20 | 2 |
| 15 | 01111 | 20 | 3 |
| 16 | 10000 | 20 | 4 |
| 17 | 10001 | 20 | 6 |
| 18 | 10010 | 20 | 7 |
| 19 | 10011 | 20 | 8 |
| 20 | 10100 | 20 | 9 |
| 21 | 10101 | 40 | 1 |
| 22 | 10110 | 40 | 2 |
| 23 | 10111 | 40 | 3 |
| 24 | 11000 | 40 | 4 |
| 25 | 11001 | 40 | 6 |
| 26 | 11010 | 40 | 7 |
| 27 | 11011 | 40 | 8 |
| 28 | 11100 | 40 | 9 |
| 29 | 11101 | Reserved | Reserved |
| 30 | 11110 | Reserved | Reserved |
| 31 | 11111 | Inf. | 0 |

For the signaled number decimal 31 and binary 11111 Inf. indicates infinity. This means that there are no soundings thus the interval between soundings is infinite. In this case the offset $\Delta_{SFC}$ is 0. For the signaled number decimal 29, binary 11101 and for the signaled number decimal 30, binary 11110 the code are reserved.

Figure 3:
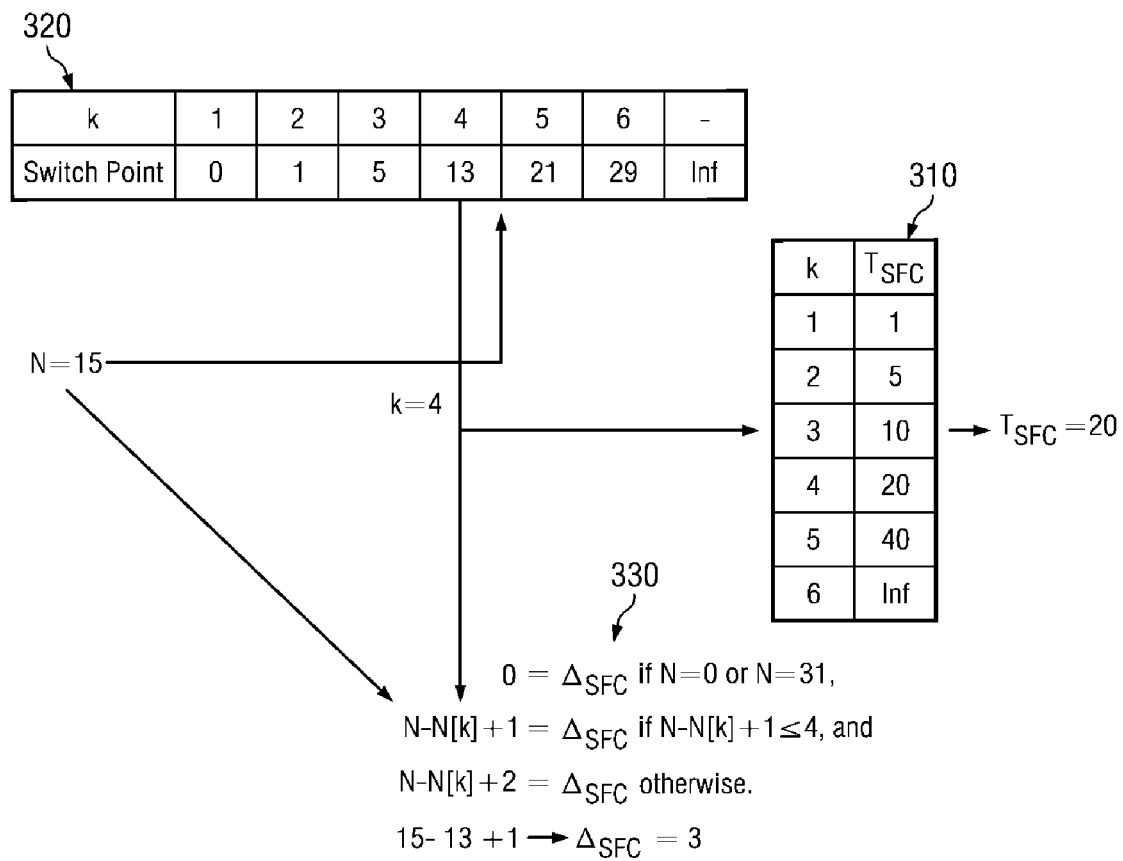
FIG. 3 shows an alternative manner of determining the sounding frequency in sub-frames and the sub-frame offset.

FIG. 3 illustrates an alternative formulation of this SRS selection. The set of possible SRS possible periods $T_{SFC}$ is defined in an ordered list $T_{SFC}[1]$ to $T_{SFC}[k]$m where $T_{SFC}[1] < T_{SFC}[2] < \ldots < T_{SFC}[k]$. In FIG. 3 this is set 310 {1, 5, 10, 20, 40, Inf.} ms, where k=6. A set of switch-point numbers N[1] to N[k+1] are formed in an ordered list where $N[1] < N[2] < \ldots < N[k] < N[k+1]$. In FIG. 3 these switch-point numbers are set 320 {0, 1, 5, 13, 21, 29, Inf.}. The base station signals via SIB a configuration index N. The UE may then finds the unique index k for which $N[k] \leq N < N[k+1]$. The sub-frame period is then $T_{SFC} = T_{SFC}[k]$. The offset $\Delta_{SFC}$ is calculated using formula 330:

$\Delta_{SFC} = 0$ if N=0 or N=31, $\Delta_{SFC} = N - N[k] + 1$ if $N - N[k] + 1 \leq 4$, and $\Delta_{SFC} = N - N[k] + 2$ otherwise.

FIG. 3 illustrates this process for N=15. If N=15 is broadcast in SIB, the UE determines that 15 is greater than or equal to N[4] which is 13 and less than N[5] which is 21. This designates an index k of 4. UE then selects $T_{SFC} = T_{SFC}[4] = 20$ ms. For the offset $\Delta_{SFC}$, the UE notes that $N - N[k] + 1 = 15 - 13 + 1 = 3$ is less than or equal to 4. Thus $\Delta_{SFC}$ is 3.

Table 3 shows the 4 bits signaled via SIB designating $T_{SFC}$ and $\Delta_{SFC}$ in time division duplex (TDD) applications according to yet another embodiment of this invention.

TABLE 3

| Decimal | Binary | $T_{SFC}$ | $\Delta_{SFC}$ |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 20 | {1, 2, 6, 11, 16} |
| 12 | 1100 | 20 | {1, 3, 6, 11, 16} |
| 13 | 1101 | 20 | {1, 6, 7, 11, 16} |
| 14 | 1110 | Inf. | NA |
| 15 | 1111 | reserved | reserved |

In Table 3 $T_{SFC}$ is selected from the set including {5, 10, 20, Inf.}. There may be plural offsets $\Delta_{SFC}$ for each value of $T_{SFC}$. For the signaled number decimal 12 and binary 1110 Inf. indicates infinity. This means that there are no soundings thus the interval between soundings is infinite. In this case the offset $\Delta_{SFC}$ is not applicable (NA). For signaled number decimal 15 and binary 1111 the code is reserved. For TDD, sounding reference signal is transmitted only in configured UL sub-frames or UpPTS.

Table 4 shows the 4 bits signaled via SIB designating $T_{SFC}$ and $\Delta_{SFC}$ in time division duplex (TDD) applications according to still another embodiment of this invention.

TABLE 4

| Decimal | Binary | $T_{SFC}$ | $\Delta_{SFC}$ |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 7} |
| 12 | 1100 | 10 | {1, 3, 6, 8} |
| 13 | 1101 | 10 | {1, 4, 6, 9} |
| 14 | 1110 | Inf | NA |
| 15 | 1111 | reserved | reserved |

In Table 4 $T_{SFC}$ is selected from the set including {10, 20, Inf.}. There may be plural offsets $\Delta_{SFC}$ for each value of $T_{SFC}$. For the signaled number decimal 14 and binary 1110 Inf. indicates infinity. This means that there are no soundings thus the interval between soundings is infinite. In this case the offset $\Delta_{SFC}$ is not applicable (NA). For signaled number decimal 15 and binary 1111 the code is reserved.

This invention describes a manner to encode the SRS sub-frame configuration. This could either be table based or described in text as described above.

What is claimed is:

1. A method of wireless communication including a plurality of fixed base stations and a plurality of mobile user equipment comprising the steps of:
   each base station transmitting to any user equipment within a corresponding cell a sounding reference signal sub-frame configuration indicating sub-frames when sounding is permitted using jointly coding periodicity $T_{SFC}$ and offset $\Delta_{SFC}$, wherein differing base stations may transmit differing sounding reference signal sub-frame configurations;
   each user equipment within said corresponding cell recognizing said sounding reference signal sub-frame configuration; and each user equipment sounding only at sub-frames when sounding is permitted including maintaining a sub-frame count $C_{SFC}$, and sounding only if $\Delta_{SFC}=(C_{SFC})$ mod $T_{SFC}$.

2. The method of claim 1, wherein:

said step of jointly coding said periodicity $T_{SFC}$ and said offset $\Delta_{SFC}$ codes in 4 bits suitable for use in time division duplex systems as follows:

| Decimal | Binary | $T_{SFC}$ | $\Delta_{SFC}$ |
|---|---|---|---|
| 0 | 00000 | 1 | 0 |
| 1 | 00001 | 5 | 1 |
| 2 | 00010 | 5 | 2 |
| 3 | 00011 | 5 | 3 |
| 4 | 00100 | 5 | 4 |
| 5 | 00101 | 10 | 1 |
| 6 | 00110 | 10 | 2 |
| 7 | 00111 | 10 | 3 |
| 8 | 01000 | 10 | 4 |
| 9 | 01001 | 10 | 6 |
| 10 | 01010 | 10 | 7 |
| 11 | 01011 | 10 | 8 |
| 12 | 01100 | 10 | 9 |
| 13 | 01101 | 20 | 1 |
| 14 | 01110 | 20 | 2 |
| 15 | 01111 | 20 | 3 |
| 16 | 10000 | 20 | 4 |
| 17 | 10001 | 20 | 6 |
| 18 | 10010 | 20 | 7 |
| 19 | 10011 | 20 | 8 |
| 20 | 10100 | 20 | 9 |
| 21 | 10101 | 40 | 1 |
| 22 | 10110 | 40 | 2 |
| 23 | 10111 | 40 | 3 |
| 24 | 11000 | 40 | 4 |
| 25 | 11001 | 40 | 6 |
| 26 | 11010 | 40 | 7 |
| 27 | 11011 | 40 | 8 |
| 28 | 11100 | 40 | 9 |
| 29 | 11101 | Reserved | Reserved |
| 30 | 11110 | Reserved | Reserved |
| 31 | 11111 | Inf. | 0 | where: codings 29, binary 11101 and decimal 30, binary 11110 are reserved; and coding decimal 31 and binary 11111 indicates no SRS thus $T_{SFC}$ is infinite and $\Delta_{SFC}$ is 0.

3. The method of claim 1, wherein:

said step of jointly coding said periodicity $T_{SFC}$ and said offset $\Delta_{SFC}$ codes in 4 bits suitable for use in time division multiplex systems as follows:

| Decimal | Binary | $T_{SFC}$ | $\Delta_{SFC}$ |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 20 | {1, 2, 6, 11, 16} |
| 12 | 1100 | 20 | {1, 3, 6, 11, 16} |
| 13 | 1101 | 20 | {1, 6, 7, 11, 16} |
| 14 | 1110 | Inf. | NA |
| 15 | 1111 | reserved | reserved | where: coding decimal 14, binary 1110 indicates no SRS thus $T_{SFC}$ is infinite and $\Delta_{SFC}$ is thus not applicable (NA); and coding 15, binary 1111 is reserved.

4. The method of claim 1, wherein:

said step of jointly coding said periodicity $T_{SFC}$ and said offset $\Delta_{SFC}$ codes in 4 bits suitable for use in time division multiplex systems as follows:

| Decimal | Binary | $T_{SFC}$ | $\Delta_{SFC}$ |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 7} |
| 12 | 1100 | 10 | {1, 3, 6, 8} |
| 13 | 1101 | 10 | {1, 4, 6, 9} |
| 14 | 1110 | Inf | NA |
| 15 | 1111 | reserved | reserved | where: coding decimal 14, binary 1110 indicates no SRS thus $T_{SFC}$ is infinite and $\Delta_{SFC}$ is thus not applicable (NA); and coding 15, binary 1111 is reserved.

5. The method of claim 1, wherein:

said step of jointly coding said periodicity $T_{SFC}$ and said offset $\Delta_{SFC}$ includes determining a set of k possible periodicities $T_{SFC}$, disposing said set of possible periodicities $T_{SFC}$ in a monotonically increasing array of k elements $T_{SFC}(k)$, recessively defining a set of switch points N where N(0)=0 and $N(k+1)=N(k)+T_{SFC}(k)$, and transmitting an configuration index N; and said step of recognizing said sounding reference signal sub-frame configuration includes finding a unique index k for which $N(k) \leq N < N(k+1)$, determining the periodicity $T_{SFC}$ to be $T_{SFC}(k)$, and determining the offset $\Delta_{SFC}$ to be 0 if is N=0 or N=31, N−N[k]+1 if N−N[k]+1≤4 and N−N[k]+2 otherwise.

6. The method of claim 5, wherein:

said monotonically increasing array of k elements $T_{SFC}(k)$ consists of {1, 5, 10, 20, 40, Inf.} ms, where k is 6; and said switch-point numbers are 0, 1, 5, 13, 21, 29 and infinity.

* * * * *